(12) United States Patent
Lemoine et al.

(10) Patent No.: US 11,365,687 B2
(45) Date of Patent: Jun. 21, 2022

(54) PIVOT AND GEAR TRAIN

(71) Applicant: SAFRAN TRANSMISSION SYSTEMS, Colombes (FR)

(72) Inventors: Julie Marie Renée Lemoine, Moissy-Cramayel (FR); Alexis Claude Michel Dombek, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 77 days.

(21) Appl. No.: 16/646,640

(22) PCT Filed: Sep. 12, 2018

(86) PCT No.: PCT/FR2018/052238
§ 371 (c)(1),
(2) Date: Mar. 12, 2020

(87) PCT Pub. No.: WO2019/053375
PCT Pub. Date: Mar. 21, 2019

(65) Prior Publication Data
US 2020/0271059 A1 Aug. 27, 2020

(30) Foreign Application Priority Data
Sep. 12, 2017 (FR) ...................... 1758420

(51) Int. Cl.
*F16H 1/28* (2006.01)
*F02C 7/36* (2006.01)
(Continued)

(52) U.S. Cl.
CPC ................ *F02C 7/36* (2013.01); *F02K 3/06* (2013.01); *F05D 2220/323* (2013.01);
(Continued)

(58) Field of Classification Search
CPC ...... F16H 1/28; F16H 57/0018; F16H 57/043; F16H 57/08
See application file for complete search history.

(56) References Cited

U.S. PATENT DOCUMENTS 6,964,155 B2 * 11/2005 McCune .................. F02C 7/36
384/297
8,297,917 B1 * 10/2012 McCune ................ F01D 15/12
415/124.1
(Continued)

FOREIGN PATENT DOCUMENTS

EP 1 538 355 A1 6/2005
EP 2 607 695 A1 6/2013
(Continued)

OTHER PUBLICATIONS

International Patent Application No. PCT/FR2018/052238, International Search Report and Written Opinion dated Dec. 13, 2018, 19 pgs.

*Primary Examiner* — Derek D Knight
(74) *Attorney, Agent, or Firm* — Lathrop GPM LLP

(57) ABSTRACT

The invention relates to a pivot pin (5) for an epicyclic gear train sliding bearing, the pivot pin having a portion (23) forming a central shank, extending around an axial passage (15), and axially opposed, axially open circumferential grooves (25a, 25b) which radially separate two axially opposed lateral end portions (230a, 230b) of the central shank from two cantilevered lateral portions (27a, 27b). With respect to a plane (33) perpendicular to said axis of the axial passage (15) and passing through the axial middle of the axial passage, the axial distance between said plane (33) and the bottom end of one of the circumferential grooves (25a) is smaller than the axial distance between said plane and the bottom end of the axially opposed circumferential groove (25b).

14 Claims, 4 Drawing Sheets

(51) Int. Cl.
*F02K 3/06* (2006.01)
*F16H 57/04* (2010.01)
*F16H 57/08* (2006.01)

(52) U.S. Cl.
CPC ...... *F05D 2230/60* (2013.01); *F05D 2240/60* (2013.01); *F05D 2260/40311* (2013.01); *F05D 2260/98* (2013.01); *F16H 1/28* (2013.01); *F16H 57/0479* (2013.01); *F16H 2057/085* (2013.01)

(56) References Cited

U.S. PATENT DOCUMENTS 8,484,942 B1 * 7/2013 McCune ............. F16H 57/0486
60/39.08
2010/0331140 A1 * 12/2010 McCune ............... F01D 25/162
475/331

FOREIGN PATENT DOCUMENTS

FR 2 991 421 A1 12/2013
WO WO 2015/108709 A1 7/2015

\* cited by examiner

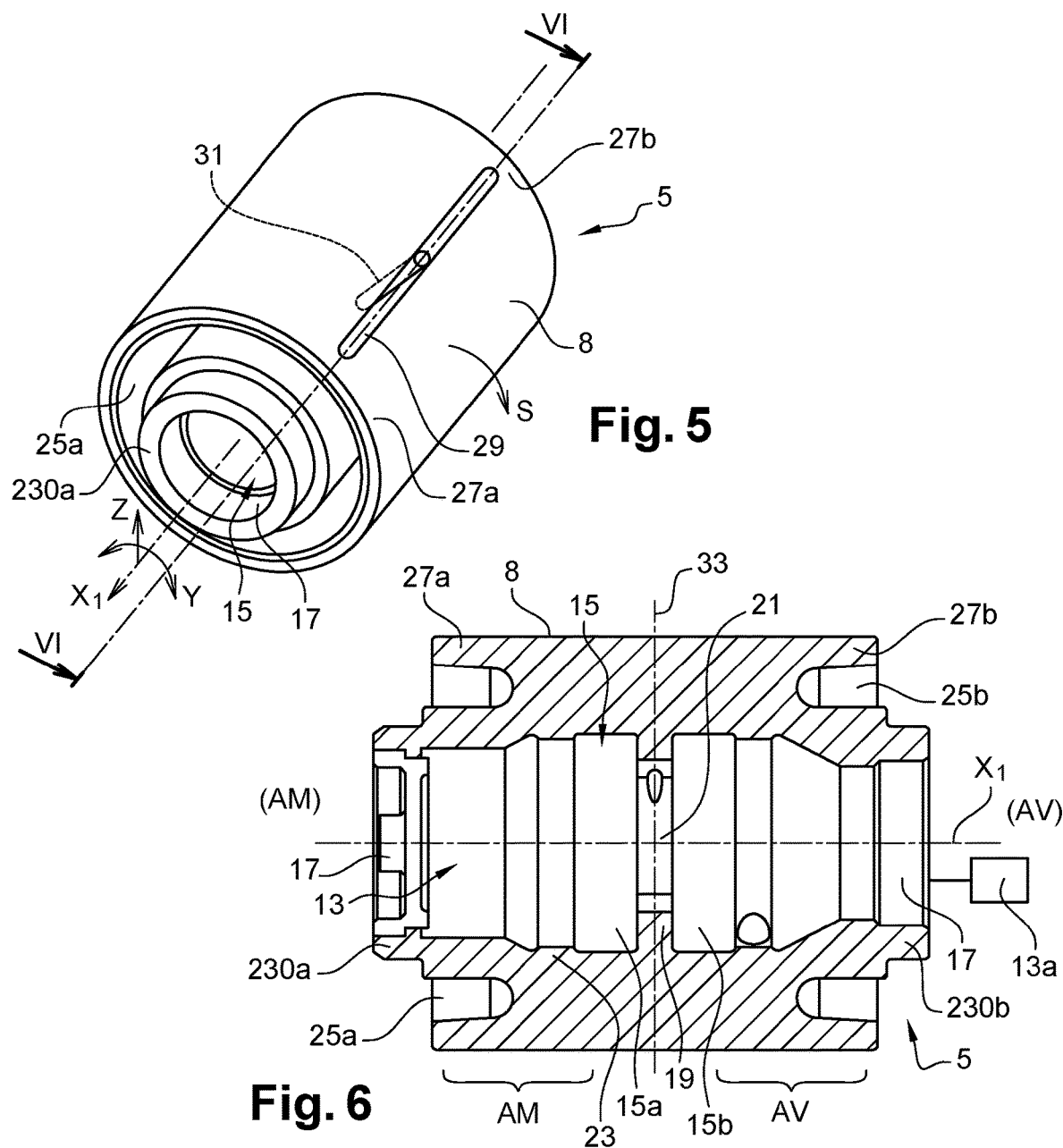
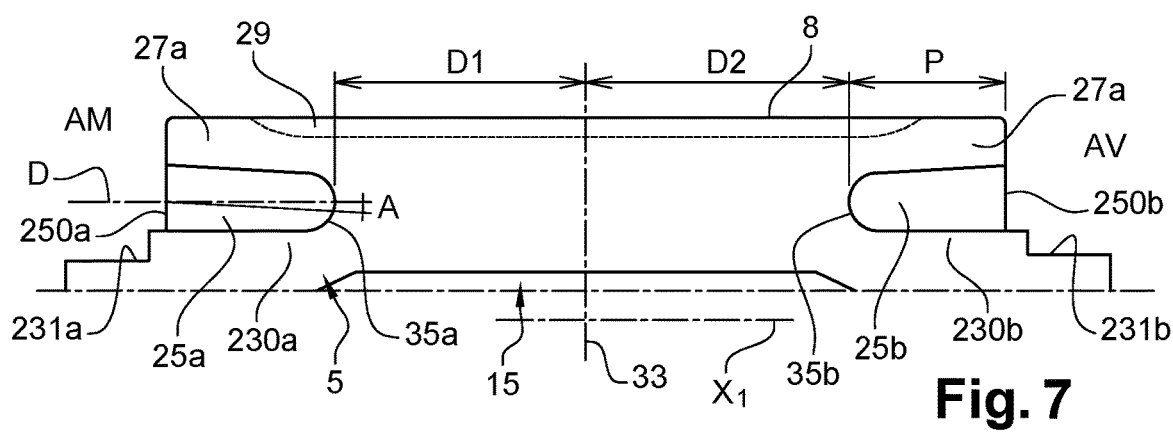

PIVOT AND GEAR TRAIN

CROSS-REFERENCE TO RELATED APPLICATIONS

This application is a 35 U.S.C. § 371 filing of International Application No. PCT/FR2018/052238 filed Sep. 12, 2018, which claims the benefit of priority to French Patent Application No. 1758420 filed Sep. 12, 2017, each of which is incorporated herein by reference in its entirety.

The present invention relates to a sliding bearing pivot pin and one, in particular for an aircraft gas turbine engine, equipped with at least one such pivot pin.

In the present application:
- axial means parallel to the axis of rotation X about which the so-called turning blades of the concerned turbine engine are mounted in rotation,
- radial means perpendicular to the axis X,
- circumferential means extending about the axis X,
- external and internal (or outer and inner) respectively mean radially externally and radially internally relative to the axis X.

A planetary gear train is an aimed application, including an epicyclic planetary gear train which comprises an outer ring gear and planet pinions engaged with the central pinion and with the outer ring gear on a planet carrier, with the planet pinions each being able to rotate about a planet axis through said pivot pin.

Among all the epicyclic planetary gear trains are notably concerned:
- those in which the outer ring gear (a mounting also called epicyclic reducing gear) is mobile in rotation,
- but also those in which the planet carrier is fixed and the outer ring gear (a mounting also called planetary reducing gear) is mobile.

The planet carrier is fixed or able to pivot about the axis of the inner sun gear and the outer sun gear. The entry can be formed by the inner sun gear and the exit by the planet carrier.

In an aircraft gas turbine engine, epicyclic gear trains are used in particular as speed reducers for reducing the speed of rotation of the fan rotor, regardless of the rotational speed of the turbine.

The document FR 2,991,421 describes such an epicyclic reducing gear, wherein the sprocket wheels forming the planet gears are mounted on pivot pins of the planet carrier by means of sliding bearings, which is advantageous, in terms of space requirements and weight. Their service life is almost infinite, so long as they are continuously supplied with oil and the oil includes no abrasive particle.

This sensitivity to lubrication means that the deformation of the bearing on the pivot pin side must be checked.

However, non-identical misalignments were observed between upstream and downstream bearing seatings of the same pivot pin. Displacements, whether tangential, due to applied torques, and/or radial due to centrifugal force, and not symmetrical between upstream and downstream along the axis of rotation X, were observed on pivot pins.

This is damaging as it can affect the reliability of the pivot pin and the efficiency of the bearing.

The invention more particularly aims at providing a simple, efficient and cost-effective solution to this problem.

For this purpose, it provides a pivot pin for a sliding bearing of a planetary gear train, the pivot pin having a portion forming a central shank, extending around an axial passage, and axially opposite circumferential grooves which are further axially open (i.e. laterally), thus providing flexibility to the pivot pin, and which radially separate two axially opposite lateral end portions of the central shank, from two cantilevered lateral portions of the pivot pin, each circumferential groove having:
- radially, at least one width,
- as well as at least one depth, in a direction in which the circumferential groove extends inwardly of the circumferential body, from a free lateral end of one of said cantilevered lateral portions to a bottom end of that groove, this pivot pin being characterized in that, with respect to a plane perpendicular to said axis of the axial passage and passing through the axial middle of the axial passage, the axial distance (hereinafter D1) between said plane and the bottom end of one of the circumferential grooves is smaller than the axial distance (hereinafter D2) between said plane and the bottom end of the axially opposite circumferential groove.

When mounted, such a pivot pin transmits a torque between several elements. Twisting of the pivot pin may result. The pivot pin may be placed at an angle to its axis. The above solution keeps the pivot pin parallel to its axis. With such a pivot pin mounted on an epicyclic gear train, misalignment of the planet carrier teeth is avoided.

Applied to an aircraft gas turbine engine having an air inlet from which air enters and then feeds, in the downstream direction, at least one compressor and then at least one turbine of the turbine engine:
- said two lateral end portions of the above-mentioned pivot pin will become respectively axially upstream and axially downstream end portions,
- and said largest axial distance between said plane and the bottom end of one of the circumferential grooves will be on the axially downstream end portion side.

In this way, the astonishing observation is avoided that when the two lateral zones of flexibility created by the two cantilevered lateral parts are arranged symmetrically in relation to a plane passing through the axial centre of the axial passage, the misalignments of the two respectively upstream and downstream bearing seatings are different from each other: the downstream zone deforms more than the upstream zone.

By making said axial distance asymmetrical, more flexibility can be provided upstream than downstream of the pivot pin, thus better balancing the displacement of the bearing seatings and thus increasing the possible displacement of the upstream bearing seating area.

Whereas different ratios had been anticipated, it furthermore appeared that said axial distances with a ratio (hereinafter D1/D2) between 0.9 and 0.99, and preferably between 0.92 and 0.98, best met a desired balance between the deformability of all lateral areas of flexibility and the above-mentioned asymmetry, resulting in an optimisation in the expected alignment of the parts concerned.

Indeed by making said zones of flexibility asymmetrical, it has been possible to reduce the existing misalignment by more than 5% in radial (Z) and more than 1.5% in tangential (Y) directions.

In addition to the control of the alignment, overheating zones must be avoided on a pivot pin as above.

In order to promote heat transfers in the pivot pin and efficiency in the anti-misalignment effect, it is therefore recommended that the above-mentioned pivot pin should be a single piece, with its cantilevered lateral parts and its central shank in one piece.

As regards the planetary gear train, now, it is provided that it will have an outer ring gear and planet pinions engaged with the central pinion and with the outer ring gear on a planet carrier, with the planet pinions each being able to rotate about a planet axis through said pivot pin.

As for the above-mentioned turbine engine, it may comprise such a planetary gear train, the central pinion of which can surround and be solidarized in rotation with the shaft of the turbine engine compressor.

In particular, this could be a case where the outer ring gear is solidarized with a casing or a static annular ring of the low-pressure compressor.

The invention is thus applicable, for example, to a planetary gear train, such as a planetary gear train in which the outer ring gear is fixed. In this case, the planetary gear train can be called a reducing gear since the output speed, i. e. that of the planet carrier, is lower than the input speed, i. e. that of the rotating drive shaft of the central pinion.

The planet carrier can then, for example, be connected to a fan wheel upstream of the turbine engine, whose speed is thus lower than the speed of the compressor shaft.

In more detail, it may be of interest that the planetary gear train, which the invention also relates to, is such that at least one of the planet pinions has a cylindrical internal surface mounted so as to pivot about a cylindrical surface of the pivot pin considered, the planetary gear train further comprising means for supplying oil at the interface between said cylindrical surfaces, with furthermore the fact that the planet carrier comprises at least said pivot pin of the aforementioned type, with all or part of its characteristics and which the satellite is mounted on in rotation.

The invention will, if necessary, be better understood and other details, characteristics and advantages of the invention will become apparent on reading the following description given as a non-exhaustive example and with reference to the accompanying drawings in which:

FIG. 5 shows another view of a pivot pin according to the invention;

FIG. 6 is an axial cross-sectional view of FIG. 5;

FIG. 7 is an enlarged detail of FIG. 6;

Figure 10:
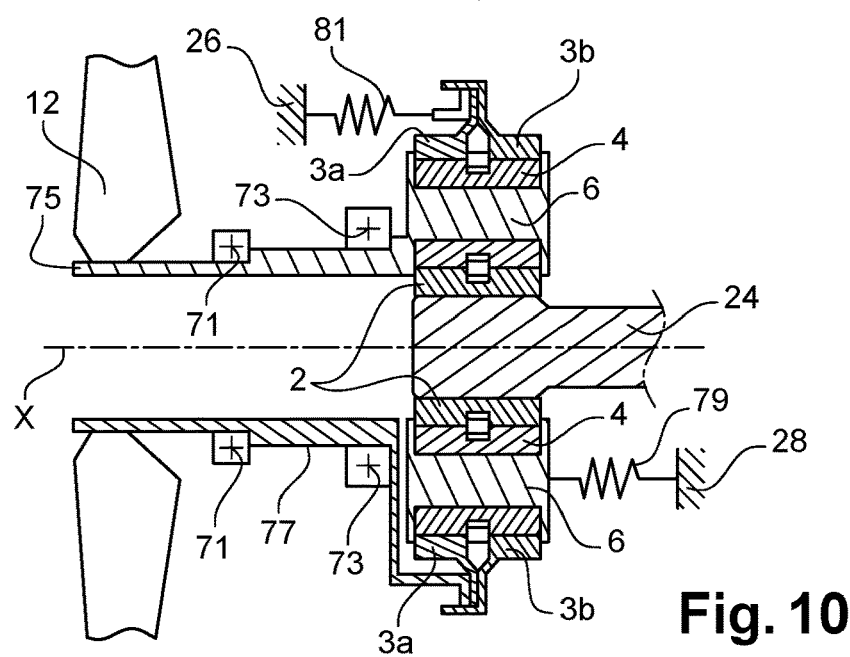

FIG. 10 compares two epicyclic gear and (top) planetary (bottom) solutions.

Figure 1:
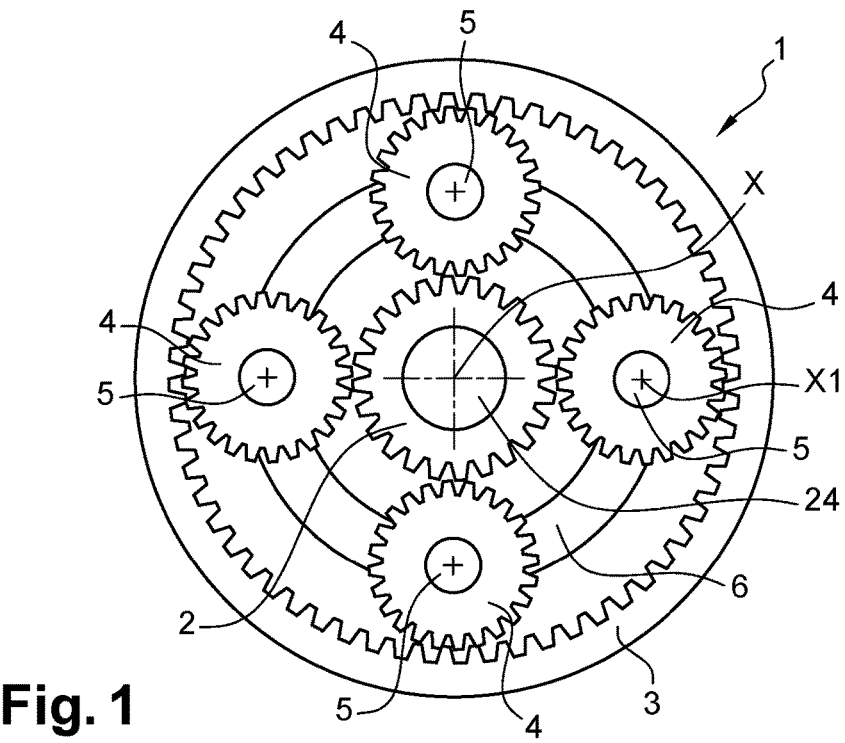
FIG. 1 is a front diagram of a planetary gear train, axially from upstream.
Figure 2:
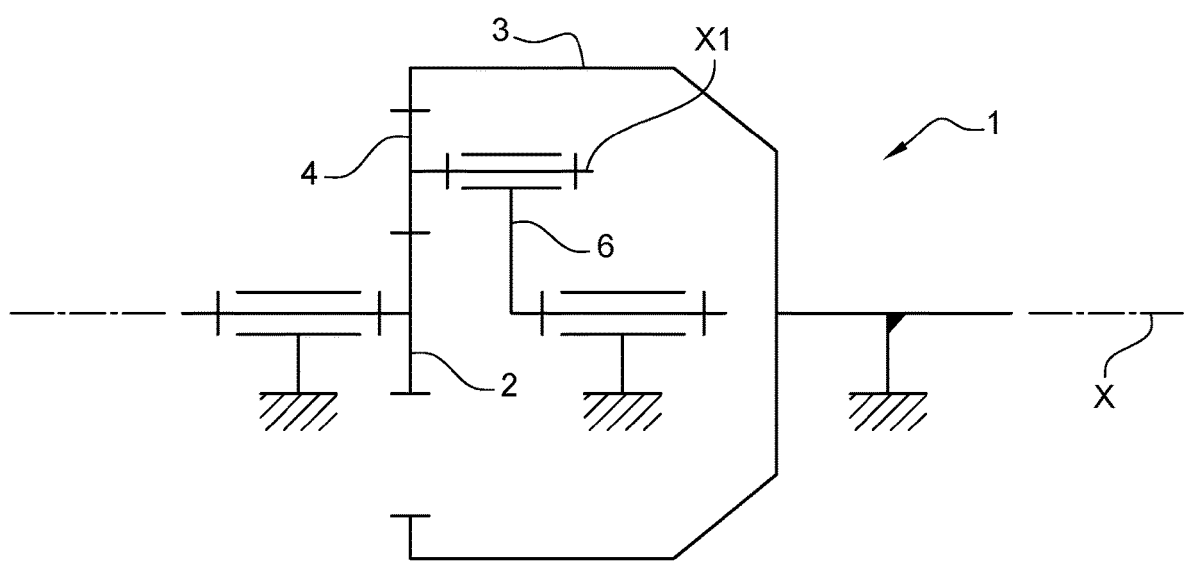
FIG. 2 is a kinematic diagram of an epicyclic gear train.

FIGS. 1 and 2 schematically illustrate the structure of an epicyclic reducing gear 1 on which the invention can be based. The reducing gear or planetary gear train 1 typically includes an inner sun gear 2 (also called a sun gearing) and an outer sun gear 3 (also called an outer ring gear), the two sun gears being coaxial. The inner sun gear, or central pinion 2, can be movable in rotation around its X axis, while the outer sun gear 3, or outer ring gear, can be fixed, or vice versa. The planetary gear train 1 further comprises planet gears 4 mounted to be movable in rotation on pivot pins 5 of a planet gear carrier 6. Each planet gear 4 meshes with both the inner sun gear 2 and the outer sun gear 3. The planet gear carrier 6 is fixed or able to pivot about the axis X of the inner sun gear 2 and the outer sun gear 3. The inlet can be formed by the inner sun gear 2 and the outlet by the planet gear carrier 6.

The planet gear carrier 6 is for example coupled in rotation to an impeller (in the case of a turboprop) or a fan wheel (in the case of a turbojet engine).

Figure 4:
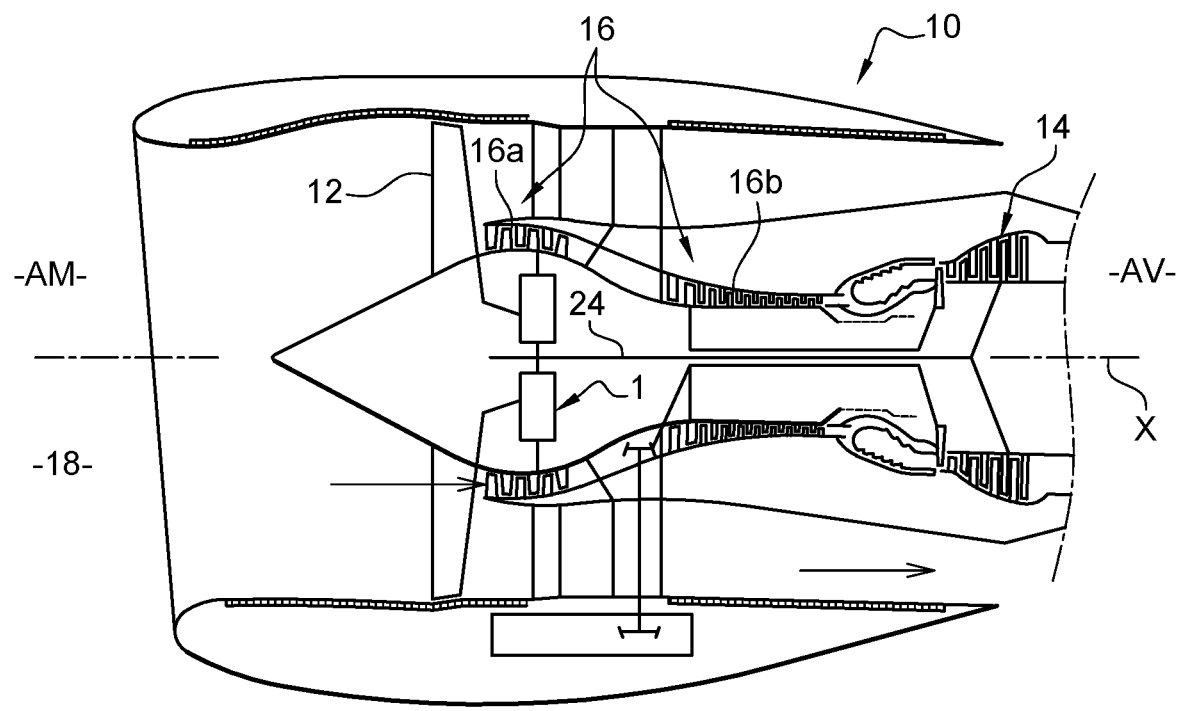
FIG. 4 is a longitudinal diagram of a turbine engine.

In an aircraft gas turbine engine 10, planetary gear trains 1 are more particularly used as speed reducers to reduce the rotational speed of a rotor, such as a blower 12 of FIG. 4, independently from the rotational speed of at least one turbine 14 axially coupled downstream to at least one compressor 16 with which the turbine engine is also equipped. First the front air inlet 18, then the blower 12 and the compressor 16 are passed through by air.

The central pinion, or inner sun gear 2, surrounds and is then fixed in rotation to the shaft 24 of the compressor 16, as illustrated for example in FIGS. 1,4. In particular, the planetary gear train 1 can be mounted in a radially formed annular enclosure inside a low-pressure compressor 16a arranged downstream of the blower 12 and upstream of a high-pressure compressor 28b, as shown in FIG. 4.

As best seen in FIGS. 1 to-3, each planet gear 4 includes a cylindrical inner surface 7 mounted to pivot about a cylindrical surface 8 (outer bearing seating surface of the pivot pin 5 corresponding to the planet carrier 6 so as to form a sliding bearing.

The interface 9 between the two cylindrical surfaces 7, 8 therefore must be supplied with oil. For this purpose, as shown in FIG. 6, the reducing gear or planetary gear train 1 comprises lubricant supply means 13 connected to a lubricant source 13a and comprising a chamber 15 (51 FIG. 5), also called an axial passage, extending substantially along the axis X1 of the relevant pivot pin 5. At least one of the ends 17 of the chamber 15 is connected to an oil inlet channel. If only one of the ends 17 forms an oil inlet, the other end is plugged. Typically the plugged end 17 will be on the left side in FIGS. 5-7. The chamber 15 can be generally cylindrical. It consists of one or more part(s), such as the two parts 15a, 15b (see FIG. 9) separated by a radially extending median partition 19. The lateral ends 17 of the chamber 15 are provided with axial passages having a smaller diameter than the chamber 15, with at least one such passage forming an oil inlet, as indicated above. A hole 21 providing communication between the portions 15a, 10b of the chamber 15 goes through the central wall 19.

FIGS. 4 and 5, show that the pivot pin 5 additionally has an outer (substantially) cylindrical surface 8 having an axis X1 adapted to form a sliding bearing with the inner (substantially) cylindrical surface 7 of the planet pinion 4, as well as a radially central shank portion 23 extending around the axial passage 15. It is around the axis X1 that the pivot pin is adapted to rotate, in the direction S imposed by its mounting on the reducing gear. In addition, this pivot pin has open axially (i.e. laterally), axially opposed circumferential grooves 25a,25b, providing flexibility to the pivot pin. These circumferential grooves radially separate two axially opposite lateral end parts 230a,230b from two cantilevered lateral parts 27a,27b each with a peripheral bearing surface 231a, 231b (only that referenced 230a is visible in FIG. 5) of the central shank 23.

Roughly speaking, the direction (such as D; FIG. 7) in which a circumferential groove extends is axial (parallel to the axis X1). More finely, a radial inclination A of a few degrees inwards can be noted.

Each circumferential groove 25a,25b has a bottom end 35a,35b. And, each circumferential groove further has a free lateral end 250a,250b located at the corresponding free end of the cantilevered lateral portion 27a or 27b under consideration and (at least) a depth (P), in a direction in which the circumferential groove extends inward the pivot pin, from said free lateral end to the corresponding bottom end 35a, 35b.

The radially outer circumferential surface 8 has an elongated feed slot 29 parallel to the axis X1 for the supply of lubricating liquid. This slot communicates with a radial passage 31, which communicates with the above-mentioned axial passage 15. The liquid lubricant coming out of the slot 29 is considered to flow on the outer surface 8 in the direction S in FIG. 5, when the reducing gear 1 is running.

Figure 3:
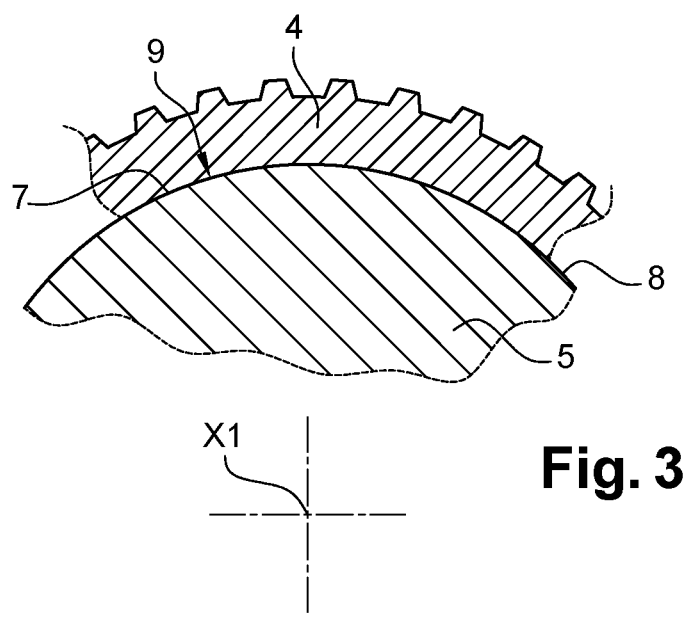
FIG. 3 is a local sectional view of the sliding bearing.

On the pivot pins of the prior art mounted on epicyclic gear trains and/or gas turbine engines for aircraft, it has been found that, when the two lateral zones of flexibility created by the two cantilevered lateral parts 27a,27b are arranged symmetrically with respect to a plane 33 perpendicular to said axis X1 of the axial passage 15 and passing through the axial centre of this axial passage, the misalignments of the respectively upstream and downstream, bearing seatings, are different from one another. The plane 33 is typically the plane of the outer bearing seating surface 8 of the pivot pin in which the tooth (teeth) of the pinion(s) meshing with the pivot pin under consideration is/are located (pinion 4 in FIG. 1 or 3).

To overcome this disadvantage, it is proposed here that, with respect to the plane 33, the axial distance D1 (FIG. 7) between this plane 33 and one of the bottom ends 35a,35b of the circumferential grooves should be smaller than the axial distance D2 between said plane and the other bottom end of the axially opposite circumferential groove.

In the mounting provided on the reducing gear 1, which is thus seen from the front, axially from upstream, said two lateral end parts 230a,230b are respectively axially upstream (AM) and axially downstream (AV) end parts. And the axial distance between said plane 33 and the bottom end 35a or 35b of the circumferential groove to be considered is greater on the axially downstream end portion side 230b (axial distance D2) than on the axially upstream end portion side 230a (axial distance D1).

Thus, if, as observed on current aircraft gas turbine engine mountings, the downstream zone (AV) of a pivot pin deforms more than the upstream zone (AM), we will have, with these axial distances D1 and D2, reached the goal of taking these imbalances into account and thus rebalancing the displacement of the bearing seatings and thus increasing the possible displacement of the upstream bearing seating zone.

In this respect, on an epicyclic gear train 1 with pivot pins 5 as shown in the example with reference to FIG. 1, a ratio D1/D2 between 0.92 and 0.98 is preferably provided.

Basically, the forces applied to the pivot pin are unbalanced between the upstream and downstream directions (due to the non-symmetrical shape of the planet carrier in relation to the median plane). Locally modifying the distance between the bearing seatings and the median plane, and the stiffness will therefore in the long run make it possible to achieve more or less the same stiffness on both sides of the median plane, over the whole reducing gear. Thus the cylindrical outer part of the pivot pin remains parallel to the overall axis of rotation of the reducing gear, improving the operation of the gear teeth.

Achieving material continuity of the pivot pin should promote heat conduction and thus lower the temperature on the outer circumferential surface 8 without disturbing the need for flexibility in the alignment, where required.

Therefore, in order to further promote these heat transfers and the efficiency in the anti-misalignment effect, it is furthermore recommended that the above-mentioned pivot pin should be in one piece, with its cantilevered lateral parts 27a,27b and its central shank 23 being in one piece.

Figure 8:
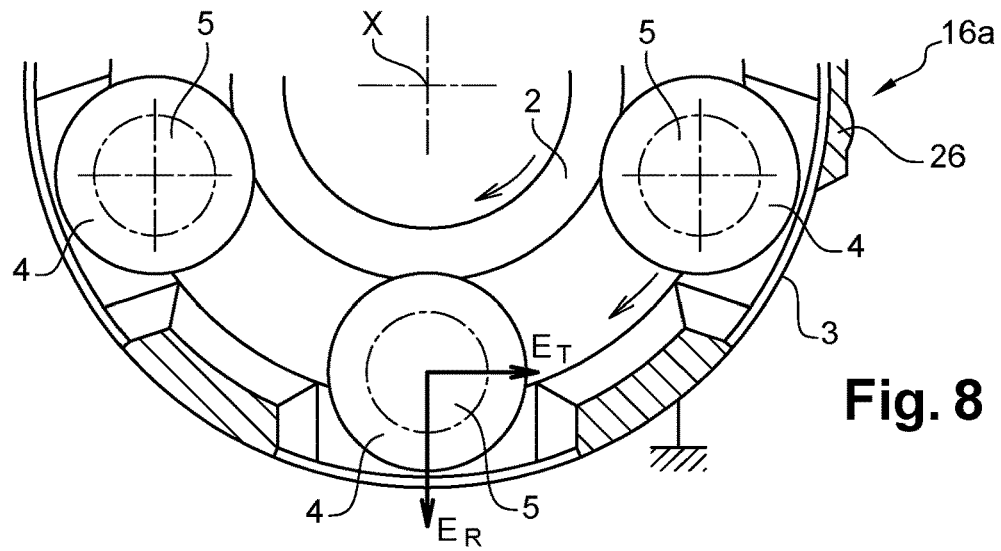
FIG. 8 is a diagram of pivot pins mounting in an epycicloid configuration.

FIGS. 8 and 10 (at the top) show again the case of a pivot pin assembly 5 in an epicyclic configuration, i.e. in a case where the central pinion 2 is mobile, but the outer ring gear 3 is fixed, solidarized with an outer casing or a static annular shell 26 of the compressor 16, in particular of the low-pressure compressor 16a; see FIG. 10 above where a spring connection 81 connects the annular shell 26 to the half-rings 3a,3b. As illustrated, both tangential ET, due to the applied torque, and radial ER, due to the centrifugal force, efforts are exerted on each pivot pin 5.

Figure 9:
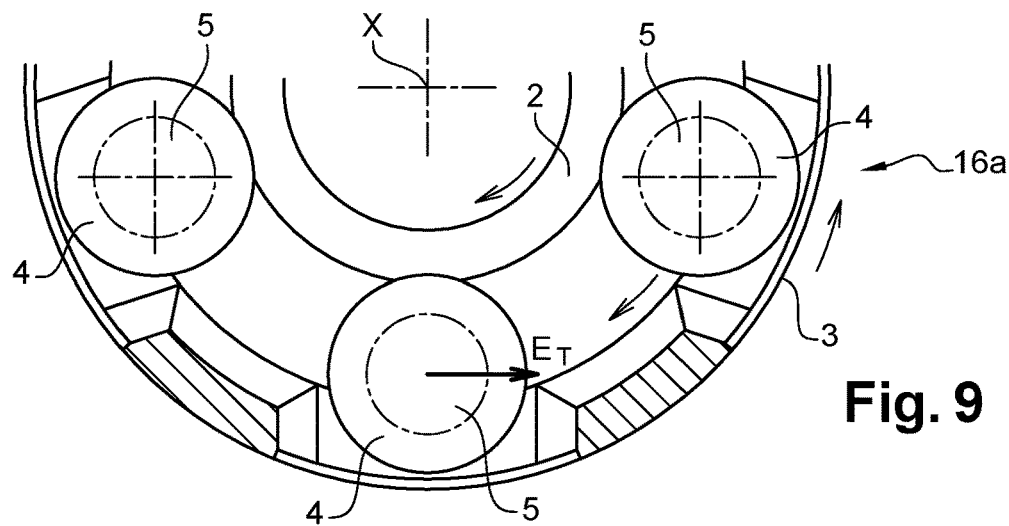
FIG. 9 is a schematic diagram of pivot pins mounting in a planetary configuration.

In FIG. 9, another application case is shown, of a mounting of pivot pins 5 in a planetary configuration, i.e. in a case where both the central pinion 2 and the outer ring gear 3 are able to rotate around the axis X of the compressor 16a, in particular of the low-pressure compressor. As illustrated, tangential forces ET due to the applied torques, are exerted on each pivot pin 5. This situation may be that of an open-rotor or a double blower.

FIG. 10 compares solutions with epicyclic gear trains in which:
- at the top, the figure shows a mobile planetary carrier and fixed-crown solution,
- at the bottom, the gear train is such that the planet carrier 6 is fixed (opposite a casing, or a static annular shell 28) and the outer ring gear is mobile (this solution being also called the planetary reducing train solution).

In connection with some of the previous figures, we find there in common a planet carrier 6 carrying planet gears 4, an inner sun gear 2 and an outer sun gear, here in two respectively upstream and downstream half rings 3a,3b with respect to the axis of rotation X. The internal sun gear 2 is engaged with the axial shaft 24, the shaft of the low-pressure compressor in the example. Bearings 71,73 support and axially guide the blower 12.

In the top solution, via an axial upstream extension 75 supported and guided by the bearings 71,73, the planet carrier 6 is engaged with the blower 12 and a fixed crown carrier is added, here connected to the upstream half crown 3a.

In the lower solution, the outer sun gear (half-rings 3a,3b) engages with the blower 12 via an upstream axial extension 77 supported and guided by the bearings 71,73. The planet carrier 6 is fixed (spring connection 79 with the static annular shell 28).

The invention claimed is:

1. A pivot pin for an epicyclic gear train sliding bearing, the pivot pin having a portion forming a central shank extending around an axial passage having an axis, and axially opposed circumferential grooves which are open laterally and which radially separate two axially opposed lateral end portions of the central shank from two cantilevered lateral portions, the axially opposed circumferential grooves having a common depth, in a direction in which the circumferential groove extends inwardly of the pivot pin, from a free lateral end of one of said cantilevered lateral portions to a bottom end of the groove, and, with respect to a plane perpendicular to said axis of the axial passage and passing through the axial center of the axial passage, an axial distance D1 between said plane and the bottom end of one of the circumferential grooves being smaller than an axial distance D2 between said plane and the bottom end of the axially opposite circumferential groove.

2. The pivot pin according to claim 1, characterized in that it is in one piece, with the central shank and the two cantilevered lateral parts being in one piece.

3. The pivot pin according to claim 1, characterized in that said axial distances D1 and D2 have a ratio D1/D2 with respect to each other between 0.9 and 0.99.

4. The pivot pin according to claim 2, characterized in that said axial distances D1 and D2 have a ratio D1/D2 with respect to each other between 0.9 and 0.99.

5. A planetary gear train of an aircraft gas turbine engine, comprising an outer ring gear and planet pinions, the planet pinions meshing with a central pinion and with the outer ring gear, the planet pinions being each mounted for a free rotation on a planet carrier, each planet pinion being able to rotate about a planet axis matching one said axis of the axial passage, via a pivot pin according to claim 1.

6. A planetary gear train of an aircraft gas turbine engine, comprising an outer ring gear and planet pinions, the planet pinions meshing with a central pinion and with the outer ring gear, the planet pinions being each mounted for a free rotation on a planet carrier, each planet pinion being able to rotate about a planet axis matching one said axis of the axial passage, via a pivot pin according to claim 2.

7. A planetary gear train of an aircraft gas turbine engine, comprising an outer ring gear and planet pinions, the planet pinions meshing with a central pinion and with the outer ring gear, the planet pinions being each mounted for a free rotation on a planet carrier, each planet pinion being able to rotate about a planet axis matching one said axis of the axial passage, via a pivot pin according to claim 3.

8. A planetary gear train of an aircraft gas turbine engine, comprising an outer ring gear and planet pinions, the planet pinions meshing with a central pinion and with the outer ring gear, the planet pinions being each mounted for a free rotation on a planet carrier, each planet pinion being able to rotate about a planet axis matching one said axis of the axial passage, via a pivot pin according to claim 4.

9. An aircraft gas turbine engine comprising said planetary gear train according to claim 5, the central pinion of which surrounds and is solidarized in rotation with a shaft of a compressor of the aircraft gas turbine engine.

10. The aircraft gas turbine engine according to claim 9, wherein the compressor comprises a low pressure compressor and the outer ring gear is solidarized with a casing or a static annular shell of the low pressure compressor.

11. The aircraft gas turbine engine according to claim 9, wherein the planet carrier is solidarized with a casing or a static annular shell.

12. The aircraft gas turbine engine according to claim 9, the aircraft gas turbine engine having an air inlet from which air enters and then feeds, in a downstream direction, the compressor and then a turbine of the aircraft gas turbine engine, characterised in that said two lateral end parts are respectively axially upstream and axially downstream end portions, and the larger of the axial distances D1 and D2 between said plane and the bottom end of one of the circumferential grooves is located at the axially downstream end portion.

13. The aircraft gas turbine engine according to claim 10, the aircraft gas turbine engine having an air inlet from which air enters and then feeds, in a downstream direction, the compressor and then a turbine of the aircraft gas turbine engine, characterised in that said two lateral end parts are respectively axially upstream and axially downstream end portions, and the larger of the axial distances D1 and D2 between said plane and the bottom end of one of the circumferential grooves is located at the axially downstream end portion.

14. The aircraft gas turbine engine according to claim 11, the aircraft gas turbine engine having an air inlet from which air enters and then feeds, in a downstream direction, the compressor and then a turbine of the aircraft gas turbine engine, characterised in that said two lateral end parts are respectively axially upstream and axially downstream end portions, and the larger of the axial distances D1 and D2 between said plane and the bottom end of one of the circumferential grooves is located at the axially downstream end portion.

* * * * *